United States Patent
Edlinger

(10) Patent No.: US 6,245,123 B1
(45) Date of Patent: Jun. 12, 2001

(54) METHOD OF MELTING OXIDIC SLAGS AND COMBUSTION RESIDUES

(75) Inventor: Alfred Edlinger, Baden (CH)

(73) Assignee: "Holderbank" Financiere Glarus AG, Glarus (CH)

(*) Notice: Subject to any disclaimer, the term of this patent is extended or adjusted under 35 U.S.C. 154(b) by 0 days.

(21) Appl. No.: 09/043,614

(22) PCT Filed: Jul. 17, 1997

(86) PCT No.: PCT/AT97/00168

§ 371 Date: Mar. 24, 1998

§ 102(e) Date: Mar. 24, 1998

(87) PCT Pub. No.: WO98/04878

PCT Pub. Date: Feb. 5, 1998

(30) Foreign Application Priority Data

Jul. 24, 1996 (AT) .................................... 1336/96

(51) Int. Cl.⁷ ...................................... C22B 7/04
(52) U.S. Cl. .................... 75/414; 75/582; 65/20
(58) Field of Search ................... 65/20; 75/414, 75/415, 524, 582, 586, 575, 576, 577, 573; 110/344, 346, 345; 266/197, 900, 229, 230; 432/95, 97

(56) References Cited

U.S. PATENT DOCUMENTS

| | | |
|---|---|---|
| 3,702,039 | 11/1972 | Stookey et al. |
| 3,996,044 * | 12/1976 | Petritsch ........................ 75/10.43 |
| 4,027,863 | 6/1977 | Aaltonen et al. |
| 4,083,715 * | 4/1978 | Langhammer ................... 75/10.16 |
| 4,330,511 * | 5/1982 | Nelson, Jr. et al. ............... 423/210 |
| 4,753,181 * | 6/1988 | Sonowski ........................ 110/346 |
| 4,758,270 * | 7/1988 | Bardenheuer ..................... 75/574 |
| 4,786,321 * | 11/1988 | Hoster et al. ..................... 75/575 |
| 4,798,532 | 1/1989 | Kimura et al. |
| 4,877,449 * | 10/1989 | Khinkis .......................... 75/414 |
| 5,605,104 * | 2/1997 | Gross et al. ..................... 110/346 |
| 5,630,369 | 5/1997 | Edlinger ......................... 110/344 |
| 5,925,165 * | 7/1999 | Pflugl et al. .................... 75/10.41 |

FOREIGN PATENT DOCUMENTS

| | | |
|---|---|---|
| 401 301 | 8/1996 | (AT) . |
| 1 048 030 | 12/1958 | (DE) . |
| 25 04 889 | 11/1975 | (DE) . |
| 41 04 252 | 8/1992 | (DE) . |
| 470067 B1 * | 7/1991 | (EP) . |
| 541 269 | 12/1993 | (EP) . |
| 1 483 702 | 7/1967 | (FR) . |
| 1 524 272 | 9/1978 | (GB) . |
| 1524272 * | 9/1978 | (GB) . |
| 90/07010 | 6/1990 | (WO) . |

OTHER PUBLICATIONS

The American Hertiage Dictionary of the English Language, Third Edition 1992.*

* cited by examiner

*Primary Examiner*—Roy King
*Assistant Examiner*—Tima McGuthry-Banks
(74) *Attorney, Agent, or Firm*—Pillsbury Winthrop LLP

(57) ABSTRACT

The process for melting oxidic slags and combustion residues having a minimum content of metallized portions such as, e.g., iron and/or carbon carriers, of 3% by weight is carried out in a shaft furnace directly heated by means of fossil fuels via burners. The molten slag bath is transferred into a hearth type furnace immediately adjoining the shaft furnace and in which metals such as, for instance, copper are separated by sedimentation under thermal dissociation and discharged separately via a bottom outlet. The completely oxidized slag reaches a consecutively arranged slag treating reactor via a separate discharge.

20 Claims, No Drawings

METHOD OF MELTING OXIDIC SLAGS AND COMBUSTION RESIDUES

BACKGROUND OF THE INVENTION

1. Field of the Invention

The invention relates to a process for melting oxidic slags and combustion residues having a minimum content of metallized portions such as, e.g., iron and/or carbon carriers, of 3% by weight.

2. Prior Art

Melting aggregates in which solid charges are to be melted under defined conditions in the first place have become known in connection with scrap melting. It was the aim of such processes to produce a molten steel melt from scrap and/or metal-containing wastelike substances, wherein the process was controlled in a manner that, in addition to a slag melt, a metal bath was formed by reduction of the melt. As a rule, acidic slag control was chosen and pig iron having a relatively low carbon content was melted, which, however, involved the relatively expensive purification of the offgases forming. Thus, a process for continuously melting scrap iron sponges or the like in a shaft furnace has already become known, for instance, from DE 25 04 889 A1, wherein a flame produced by fuel-oxygen-burning was to act on the charging material column in countercurrent from below. With such a process control, a reducing zone was produced below the oxidizing meltdown zone by admixing large coal pieces of low activity to the charging material. Such melting processes usually were aimed at melting steel or pig iron, to which end reducing conditions were necessary.

For the subsequent further treatment of slags with a view to purifying said slags in order to recover valuable raw materials and/or additives suitable for the production of cement, it has already been proposed to effect melting under oxidizing conditions. Thus, for melting inorganic combustion residues optionally loaded with heavy metals and/or heavy metal compounds, it was proposed, for instance, in AT 401 301 to feed gaseous oxygen or fuels to the charge and treat the same in a reactor while realizing as complete an oxidative reaction as possible under the formation of a foamed slag.

SUMMARY OF THE INVENTION

The present invention aims at providing a process of the initially defined kind, by which the formation of a completely oxidized slag is feasible in a simple manner and which, in a simple manner, also enables the safe separation of noxious substances and, in particular, the separation of copper prior to the consecutively provided aftertreatment of the slag.

To solve this object, the process according to the invention essentially resides in that the slag is charged into a shaft furnace, the charge is directly heated from below by means of fossil fuels, the combustion air or combustion oxygen is adjusted so as to maintain a free oxygen amount of >2% by vol. in the combustion offgases within the slag charging zone. The melt is transferred into a hearth type furnace connected with the shaft furnace and is sedimented under oxidizing conditions. The metallic phase sedimented from the slag bath in the further furnace is discharged separately from the slag phase. By being able to operate with a conventional shaft furnace as already suggested for scrap melting, the process according to the invention may be carried out with little apparative expenditure. By adjusting the combustion air and the combustion oxygen such that an amount of free oxygen of >2% by vol. and, preferably, >3% by vol. remains in the slag charging zone, the complete oxidation sought is safeguarded and burners with high efficiencies may be employed. By the melt being subsequently transferred into a heath type furnace connected with the shaft furnace and sedimenting under oxidizing conditions, it has become feasible to separate metallic phases from metals whose oxides dissociate under the high temperatures prevailing and to draw off the same continuously, thus enabling, in particular, the separation of, for instance, copper as a metallic phase in said hearth type furnace. After this, the completely oxidized slag bath may, for instance, be subjected to a reduction treatment in a simple manner, thereby enabling the recovery of further valuable substances and the formation of a slag phase free of iron or heavy metal oxides to a major extent. The process control according to the invention also allows for the simple purification of offgas, wherein noxious substances from offgas purification may be conducted in circulation and copper can be discharged as a metallic phase in a simple manner.

The process according to the invention in an advantageous manner is carried out such that shredder light fractions or organic waste substances are admixed to the fossil fuels such as, e.g., natural gas or carbon. In this manner it is feasible to process, and dispose of, further fractions enriched with noxious substances within the shaft furnace, thereby enabling the chemically bound energy content of shredder light fractions to be recovered by complete combustion.

In order to guarantee the desired oxidative treatment of the charging stock, the offgases advantageously are sucked off at a residual oxygen content of >3% by vol. Sucking off via a blower promotes the complete reaction of the charge.

In order to ensure copper oxides are thermally dissociated completely and copper is discharged in its metal form, the temperature of the melt within the hearth type furnace advantageously is maintained at >1550° C. In order to guarantee the high temperatures required for the complete dissociation of, for instance, copper oxide, the hearth type furnace advantageously may be heated via a cyclone charged with waste incineration ashes, filter dusts, Resh and/or dried sewage sludge, whereby further problem substances may be safely disposed of while utilizing their chemically bound energy.

In order to maintain the conditions of equilibrium required for the separation of the metallic phase within the hearth type furnace, it is advantageously proceeded such that oxygen and carbon are blown into the hearth type furnace so as to attain a λ value larger than 0.8 to 0.9. In this manner, the respectively desired conditions may be adapted to the respective requirements as a function of the fuels chosen for heating the hearth type furnace.

Offgas purification within the scope of the process according to the invention advantageously may be realized in that the offgases drawn off the shaft furnace are subjected to alkaline washing at a pH of >10 and that the hydroxide slurries occurring are recycled to the cyclone for heating the hearth type furnace. The thus formed hydroxide slurries, by being recycled into the hearth type furnace, can be reacted quantitatively at the high temperatures required there and, above all, halogenides and, in particular, copper chlorides can be reacted to oxyhydrates and thermally dissociated during their recycling into the hearth type furnace such that copper may be recovered and is discharged from circulation. The major portion of further noxious substances may initially be kept back via the slag melt and separated in a consecutively provided slag aftertreatment.

The arrangement according to the invention, for carrying out the process of the invention substantially is characterized in that a shaft furnace is provided, in which burners for fossil fuels such as carbon or natural gas are arranged in the lower region and that the shaft furnace, via a continuous discharge, passes over into a hearth type furnace directly connected with the shaft furnace and in which the liquid phase sediments at least partially and is heated further under oxidizing conditions, and that a tap for a sedimented phase and a further tap for the slag melt are connected to the hearth type furnace. Such a simple arrangement in terms of apparatus allows for the quantitative melting and oxidation of large amounts of oxidic slags at a relatively low energy demand so as to obtain a completely oxidized molten product suitable for subsequently provided treatment steps.

In order to safeguard that oxidic slag melt is continuously produced from the burden column and to not influence the continuous supply of materials to be smelted, the configuration advantageously is devised such that a sinter breaker is arranged in a plane located above the combustion chamber of the shaft furnace.

In order to ensure as rapid a separation as possible of the respectively formed sump of metals such as, for instance, copper within the hearth type furnace and to minimize revalidation into the slag, the configuration advantageously is such that the hearth type furnace comprises on its bottom a settling chamber for the metallic phase, which tapers relative to the hearth type furnace upper part. In this manner, the interface available for reoxidation in the equilibrium with the slag is being minimized and, at the same time, the continuous delivery of metallic melt from the hearth type furnace is rendered feasible. In order to maintain the respectively required oxidizing conditions within the hearth type furnace, the configuration advantageously is such that the hearth type furnace is equipped with bath tuyeres and, in particular, bottom tuyeres for feeding air or oxygen as well as fuels. In order to safeguard the gas permeability of the charge and impede caking or sintering within the shaft, the shaft furnace advantageously is designed such that its inner cross section tapers towards the material feed.

On the whole, it is feasible by means of the arrangement according to the invention using conventional means, to obtain a completely oxidized slag while separating components such as, for instance, copper, which interfere with the subsequent processing of the slags, wherein noxious substances may be conducted in circulation and enriched and a high portion of materials loaded with noxious substances can be safely disposed of.

DETAILED DESCRIPTION OF A PREFERRED EMBODIMENT OF THE INVENTION

In the following, the invention will be explained in more detail. A shaft furnace is charged via an opening. The charge is directly heated by burners, said burners being supplied with fossil fuels as well as optionally shredder light fractions comprising grains of below 5 mm. Secondary air may be fed through tuyeres in a further plane, in a region over which the charge is melted. In order to prevent the furnace from closing up due to sinter formation, a sinter breaker may be provided, which causes the bulk pile to be loosened by rotary or paddling movement. The combustion offgases are discharged via a duct at an oxygen content of more than 3% and supplied to offgas purification. That offgas purification effects alkaline precipitation at a pH of more than 10 while feeding alkaline media through a duct, the oxyhydrates formed being supplied to a hot cyclone via a duct. Oxygen is fed into the hot cyclone via a duct in order to ensure as complete a combustion as possible.

The completely oxidized slag bath melted from the charge reaches an immediately adjoining hearth type furnace via a tunnel. The hearth type furnace is further heated by the combustion heat released from the hot cyclone so as to keep a bath temperature of above 1550° C. If desired, air or oxygen is blown in through another duct in order to maintain oxidizing conditions.

At temperatures of above 1550° C. in the molten slag bath of the hearth type furnace, the thermal dissociation of possibly present copper oxides is effected and copper may be continuously discharged from a tapering settling chamber via a bottom outlet. The oxidizing conditions and the appropriate temperature can be maintained by means of bottom tuyeres through which carbon and oxygen may be fed.

Via a discharge, the molten slag bath reaches subsequent slag treatment by which further valuable substances such as, for instance, iron oxide or heavy metal oxides may be separated through reductive processes.

What is claimed is:

1. A process for melting oxidic slags and combustion residues having a minimum content of metallized portions of 3% by weight, said process comprising:

charging the oxidic slags into a slag charging zone of a shaft furnace;

directly heating the slag charging zone from below with fossil fuels to generate a resultant melt and combustion offgases;

adjusting an amount of combustion air or combustion oxygen so as to maintain a free oxygen amount of >2% by volume in the combustion offgases within the slag charging zone;

transferring the resultant melt into a hearth furnace connected with said shaft furnace and sedimenting the resultant melt under oxidizing conditions to generate a sedimented metallic phase and a slag phase of the resultant melt; and discharging the sedimented metallic phase from the hearth furnace separately from the slag phase.

2. A process according to claim 1, further comprising mixing shredder light fractions or organic waste substances with the fossil fuels.

3. A process according to claim 1 or 2, further comprising sucking off the combustion offgases from the shaft furnace so that the sucked off combustion offgases have a residual oxygen content of >3% by volume.

4. A process according to claim 1 or 2, further comprising maintaining the melt within the hearth furnace at >1550° C.

5. A process according to claim 1 or 2, further comprising heating the hearth furnace via a cyclone charged with at least one member selected from the group consisting of waste incineration ashes, filter dusts, Resh and dried sewage sludge.

6. A process according to claim 1 or 2, blowing oxygen and carbon into the hearth furnace so as to attain a λ value larger than 0.8 to 0.9.

7. A process according to claim 1 or 2, further comprising heating the hearth furnace via a cyclone, drawing the combustion offgases from the shaft furnace, subjecting the drawn off combustion offgases to alkaline washing at a pH of >10 to produce hydroxide slurries, and recycling the hydroxide slurries to the cyclone for heating the hearth furnace.

8. A process according to claim 3, further comprising maintaining the hearth furnace >1550° C.

9. A process according to claim 3, further comprising heating the hearth furnace via a cyclone charged with at least one member selected from the group consisting of waste incineration ashes, filter dusts, Resh and dried sewage sludge.

10. A process according to claim 4, further comprising heating the hearth furnace via a cyclone charged with at least one member selected from the group consisting of waste incineration ashes, filter dusts, Resh and dried sewage sludge.

11. A process according to claim 8, further comprising heating the hearth furnace via a cyclone charged with at least one member selected from the group consisting of waste incineration ashes, filter dusts, Resh and dried sewage sludge.

12. A process according to claim 3, blowing oxygen and carbon into the hearth furnace so as to attain a $\lambda$ value larger than 0.8 to 0.9.

13. A process according to claim 4, blowing oxygen and carbon into the hearth furnace so as to attain a $\lambda$ value larger than 0.8 to 0.9.

14. A process according to claim 8, blowing oxygen and carbon into the hearth furnace so as to attain a $\lambda$ value larger than 0.8 to 0.9.

15. A process according to claim 9, blowing oxygen and carbon into the hearth furnace so as to attain a $\lambda$ value larger than 0.8 to 0.9.

16. A process according to claim 10, blowing oxygen and carbon into the hearth furnace so as to attain a $\lambda$ value larger than 0.8 to 0.9.

17. A process according to claim 11, blowing oxygen and carbon into the hearth furnace so as to attain a $\lambda$ value larger than 0.8 to 0.9.

18. A process according to claim 3, further comprising heating the hearth furnace via a cyclone, drawing the combustion offgases from the shaft furnace, subjecting the drawn off combustion offgases to alkaline washing at a pH of >10 to produce hydroxide slurries, and recycling the hydroxide slurries to the cyclone for heating the hearth furnace.

19. A process according to claim 4, further comprising heating the hearth furnace via a cyclone, drawing the combustion offgases from the shaft furnace, subjecting the drawn off combustion offgases to alkaline washing at a pH of >10 to produce hydroxide slurries, and recycling the hydroxide slurries to the cyclone for heating the hearth furnace.

20. A process according to claim 5, further comprising drawing the combustion offgases from the shaft furnace and subjecting the drawn off combustion offgases to alkaline washing at a pH of >10 to produce hydroxide slurries, and recycling the hydroxide slurries to the cyclone for heating the hearth furnace.

* * * * *